US006804094B2

(12) United States Patent
Kampmeyer (10) Patent No.: US 6,804,094 B2
(45) Date of Patent: Oct. 12, 2004

(54) GROUND FAULT CIRCUIT INTERRUPTER

(75) Inventor: Roy A. Kampmeyer, Lansdale, PA (US)

(73) Assignee: Power Electronic Systems, Inc., Lansdale, PA (US)

( * ) Notice: Subject to any disclaimer, the term of this patent is extended or adjusted under 35 U.S.C. 154(b) by 46 days.

(21) Appl. No.: 10/115,658

(22) Filed: Apr. 4, 2002

(65) Prior Publication Data

US 2003/0189804 A1 Oct. 9, 2003

(51) Int. Cl.$^7$ ................................................ H02H 3/00
(52) U.S. Cl. ........................................ 361/42; 361/101
(58) Field of Search ................................. 361/100, 101, 361/94–96, 93.2, 42–50, 91, 93, 98; 315/291

(56) References Cited

U.S. PATENT DOCUMENTS

| | | | |
|---|---|---|---|
| 3,060,348 A | 10/1962 | Todd | |
| 3,178,617 A | 4/1965 | Coker | |
| 3,302,062 A | 1/1967 | Craig | |
| 3,303,388 A | 2/1967 | Means | |
| 3,311,787 A | 3/1967 | Gunderman | |
| 3,558,980 A | 1/1971 | Florance | |
| 3,571,608 A | 3/1971 | Hurd, III | |
| 3,654,518 A | 4/1972 | Phelps et al. | |
| 3,668,470 A | 6/1972 | Ambler et al. | |
| 3,678,291 A | 7/1972 | Coe | |
| 3,887,860 A * | 6/1975 | Bernhardt et al. | 363/57 |
| 4,031,432 A | 6/1977 | Proctor | 361/7 |
| 4,245,184 A * | 1/1981 | Billings et al. | 323/235 |
| 4,410,925 A | 10/1983 | Tucker et al. | 361/42 |
| 4,825,330 A | 4/1989 | Walchle | 361/95 |
| 4,914,542 A | 4/1990 | Wagoner | 361/98 |
| 4,926,288 A | 5/1990 | Bradley | 361/101 |
| 5,216,352 A | 6/1993 | Studtmann et al. | 323/241 |
| 5,319,515 A | 6/1994 | Pryor et al. | 361/93 |
| 5,606,482 A | 2/1997 | Witmer | 361/93 |
| 5,774,316 A | 6/1998 | McGary et al. | 361/42 |
| 5,831,807 A * | 11/1998 | Masannek et al. | 361/93.2 |
| 5,835,322 A | 11/1998 | Smith et al. | 361/45 |
| 5,844,759 A | 12/1998 | Hirsh et al. | 361/42 |
| 5,914,843 A * | 6/1999 | Hopkins et al. | 361/42 |
| 5,920,451 A * | 7/1999 | Fasano et al. | 361/45 |
| 5,926,354 A | 7/1999 | King | 361/93 |
| 5,933,063 A | 8/1999 | Keung et al. | 335/18 |
| 5,943,198 A | 8/1999 | Hirsh et al. | 361/42 |
| 5,949,197 A * | 9/1999 | Kastner | 315/291 |
| 6,002,566 A | 12/1999 | Arikawa et al. | 361/93.1 |
| 6,021,055 A * | 2/2000 | Parry | 363/49 |
| 6,067,219 A | 5/2000 | Armstrong et al. | 361/101 |
| 6,278,596 B1 | 8/2001 | Simpson | 361/42 |
| 6,356,426 B1 * | 3/2002 | Dougherty | 361/102 |
| 6,392,513 B1 * | 5/2002 | Whipple et al. | 335/18 |
| 6,504,691 B1 * | 1/2003 | Matsui et al. | 361/38 |
| 6,525,490 B1 * | 2/2003 | Rinaldi | 315/291 |
| 6,590,757 B2 * | 7/2003 | Pahl et al. | 361/93.2 |
| 6,633,467 B2 * | 10/2003 | Macbeth et al. | 361/42 |

* cited by examiner

Primary Examiner—Brian Sircus
Assistant Examiner—Danny Nguyen
(74) Attorney, Agent, or Firm—Howson and Howson (57) ABSTRACT

A ground fault circuit interrupter for use on a circuit having an AC power source electrically connected to a load circuit via hot and neutral lines. The ground fault circuit interrupter having at least a pair of switching components forming part of the circuit for opening the circuit upon occurrence of a ground fault. The switching components are electronic semiconductors, preferably MOSFETs, which permit substantially instantaneous switching. In addition, preferably the ground fault circuit interrupter includes a pair of redundant switching channels so that failure of any one component does not prevent the ground fault circuit interrupter from properly opening the circuit upon detection of a ground fault.

17 Claims, 7 Drawing Sheets

GROUND FAULT CIRCUIT INTERRUPTER

FIELD OF THE INVENTION

The present invention relates to a ground fault circuit interrupter (GFCI) for use in detecting the occurrence of ground fault or like conditions and for thereafter promptly interrupting an electrical connection between an AC electrical power source and load circuit, and more particularly, the present invention relates to a ground fault circuit interrupter which provides reliable and substantially instantaneous detection and clearance of ground faults.

BACKGROUND OF THE INVENTION

One important function of a ground fault circuit interrupter (GFCI) is to provide electric shock protection to individuals that come into contact, or close proximity, to an unintentionally exposed wire, or to a conductive component of an ungrounded appliance in which an internal wiring fault undesirably provides an electrical connection between the wiring and the ungrounded component. A common example of where such a fault is particularly a problem is at a construction site where workers regularly utilize portable electrical equipment and devices that are electrically connected to an AC power supply or generator.

Ground fault circuit interrupters provide the required protection by de-energizing the electrical connection between the power source and load circuit when an undesired loop connection is detected between the hot lead of the power source and some other circuit which is typically to ground via an individual's body that forms part of, and completes, the circuit. This type of ground fault generally occurs due to unnoticed faulty wire insulation. If a ground fault circuit interrupter does not interrupt such a fault, fault current can pass through the human body and cause serious physical injury and/or death.

The extent of damage to the human body caused by such a ground fault depends on the relative amount of fault current and the length of time of the application of the current through the body. Ground fault current as small as several milliamps may be capable of causing injury, and the longer the application of fault current through the body, the more severe the injury and the greater the potential for death. At this relatively low level of current, a fuse, circuit breaker, or other overcurrent protection device will not detect the existence of such a potentially dangerous fault. Thus, ground fault circuit interrupters provide an important and potentially life saving function, and it is imperative that ground fault circuit interrupters are reliable and cut off any fault current as quickly as possible.

Examples of various types of ground fault circuit interrupters utilized in various applications are disclosed by U.S. Pat. No. 3,558,980 issued to Florance; U.S. Pat. No. 3,668,470 issued to Ambler et al.; U.S. Pat. No. 4,410,925 issued to Tucker et al.; U.S. Pat. No. 5,774,316 issued to McGary et al.; U.S. Pat. No. 5,835,322 issued to Smith et al.; U.S. Pat. No. 5,844,759 and U.S. Pat. No. 5,943,198 issued to Hirsh et al.; U.S. Pat. No. 5,933,063 issued to Keung et al.; and U.S. Pat. No. 6,278,596 issued to Simpson.

Prior art ground fault circuit interrupters are relatively slow and relatively unreliable. For example, electromechanical relays and solenoids operate relatively slowly after being energized or de-energized, and the mechanical contacts of such relays are unreliable because they can weld together over time. Thus, even if an electro-mechanical relay detects a ground fault, it may open too slowly, or not at all, thereby unnecessarily subjecting an individual to significant harm. Similarly, the use of thyristors as switching components for a GFCI are also too slow. For instance, it is highly desirable for safety reasons that arcing type faults and other faults be detected and cleared in a period of time less than that about 16 milliseconds which corresponds to the time required for a single 60 Hz sine wave. None of the above referenced components or known GFCIs is believed to meet this requirement for all faults occurring anytime during the input AC sine wave.

Other problems are also associated with prior art ground fault circuit interrupters. For example, a failure of any one component in a GFCI may prevent the GFCI from functioning properly and promptly to detect and/or clear a ground fault thereby unnecessarily subjecting individuals to serious injuries. In addition, some GFCIs only detect ground faults looping from the hot power lead and not from both the hot and neutral leads. Further, some GFCIs require the user to reset the GFCI after a non-fault power interruption and thereby permit the GFCI to be in a non-operating condition the instant when the power is re-applied. Still further, prior art GFCIs require heavy integration of the fault signal before ultimately opening the circuit, and thus, cannot clear a ground fault within 16 milliseconds. Finally, some prior art GFCIs require the use of a separate ground return line to sense a fault.

The use of semiconductors as switching elements is known with respect to overcurrent interrupters and devices for detecting overcurrent conditions within a circuit. Examples are disclosed by U.S. Pat. No. 3,060,348 issued to Todd; U.S. Pat. No. 3,178,617 issued to Coker; U.S. Pat. No. 3,302,062 issued to Craig; U.S. Pat. No. 3,303,388 issued to Means; U.S. Pat. No. 3,311,787 issued to Gunderman; U.S. Pat. No. 3,571,608 issued to Hurd; U.S. Pat. No. 3,654,518 issued to Phelps et al.; U.S. Pat. No. 3,678,291 issued to Coe; U.S. Pat. No. 4,031,432 issued to Proctor; U.S. Pat. No. 4,825,330 issued to Walchle; U.S. Pat. No. 4,914,542 issued to Wagoner; U.S. Pat. No. 4,926,288 issued to Bradley; U.S. Pat. No. 5,216,352 issued to Studtmann et al.; U.S. Pat. No. 5,319,515 issued to Pryor et al.; U.S. Pat. No. 5,606,482 issued to Witmer; U.S. Pat. No. 5,926,354 issued to King; U.S. Pat. No. 6,002,566 issued to Arikawa et al.; and U.S. Pat. No. 6,067,219 issued to Armstrong et al.

Although the aforementioned interrupters may function satisfactorily for their intended purposes, there exists a need for a ground fault circuit interrupter that is highly reliable throughout its life and that provides substantially instantaneous switching (ie., detects and clears a ground fault within 16 milliseconds or within the time required for a single 60 Hz sine wave). The GFCI according to the present invention should utilize an electronic switching component instead of an electro-mechanical device, but should not utilize a thyristor or like device which cannot switch instantaneously. The failure of any single element within the GFCI should not prevent the GFCI from properly functioning to detect and clear a ground fault, and preferably the GFCI should store the fault sequence and require resetting before a connection is permitted to be re-established. In addition, preferably the GFCI should have a self-protecting overcurrent trip circuit and should not require the use of a separate ground return wire. Further, the GFCI should have a self-testing circuit that can be utilized to simulate a fault and test the functioning of the GFCI and should include an audible and/or visual fault indicating alarm.

OBJECTS OF THE INVENTION

With the foregoing in mind, a primary object of the present invention is to provide an improved ground fault circuit interrupter which is highly reliable even in the event of a single component failure and which utilizes electronic sensing and switching components capable of detecting and clearing a ground fault preferably within 16 milliseconds or within the time required for a single 60 Hz sine wave.

Another object of the present invention is to provide a ground fault circuit interrupter which stores fault sequences and requires resetting before a connection is permitted to be re-established, which has a self-protecting overcurrent trip circuit, which detects faults from both the hot and neutral lines, and which does not require the use of a separate ground return wire.

A further object of the present invention is to provide a ground fault circuit interrupter which has a self-testing circuit that can be utilized to simulate a ground fault and test the functioning of the GFCI and which includes an audible and/or visual fault indicating alarm.

A still further object of the present invention is to provide a novel ground fault circuit interrupter and method which surpasses present industrial specifications defining adequate GFCI speed and reliability of operation and which provides individuals superior protection against injury from ground faults.

SUMMARY OF THE INVENTION

More specifically, the present invention is a ground fault circuit interrupter for use on a circuit including an AC power source and a load electrically connected via hot and neutral lines. The ground fault circuit interrupter has at least one switching component that forms a part of the hot line of the circuit for opening the circuit upon the occurrence of a ground fault. The switching component is an electronic semiconductor which permits substantially instantaneous switching. Preferably, the electronic semiconductor switching component is a MOSFET.

Preferably, the ground fault circuit interrupter has dual redundant channels each capable of detecting and opening the circuit should a ground fault occur. Thus, any one component failure within the ground fault circuit interrupter should not prevent the ground fault circuit interrupter from properly functioning to detect and clear a ground fault.

Preferably, each channel of the ground fault interrupter has a pair of MOSFET switching components each forming a part of the AC power source/load circuit on the hot line of the circuit. Each of the pair of MOSFET switching components is connected in series across its drain and source to the hot line of the circuit, and the sources of the pair of MOSFET switching components are arranged adjacent and back to back. Preferably each MOSFET switching component has an internal substrate diode connected across its drain and source, and the diodes are disposed back-to-back. Whereby, during a normal non-fault condition, current flows in a path from drain to source through one of the MOSFET switching components while current flows in a path from source to drain of the opposite MOSFET switching component through its respective diode, and during a ground fault condition, both MOSFET switching components are driven into an off condition and prevent any flow of current through the drain to source paths.

According to another aspect of the present invention, a method is provided for ground fault protecting a circuit having an AC power source and a load electrically connected via hot and neutral lines. The method includes placing each of a pair of MOSFETs in series across its drain and source to the hot line of the circuit such that the sources of the MOSFETs are disposed back to back. In addition, each MOSFET preferably has an internal substrate diode connected across its drain and source such that the diodes are disposed back-to-back. During a normal non-ground fault operating condition, current flows in a path from drain to source through one of the MOSFETs while current flows in a path from source to drain of the opposite MOSFET via its diode. When a ground fault is detected, both MOSFETs are substantially instantaneously driven into an off condition to prevent any flow of current within the MOSFETs through the drain to source paths. The use of the MOSFETs enable a ground fault to be detected and cleared within 16 milliseconds after initial occurrence of the ground fault and within one single AC fault current sine wave length of a 60 Hz sine wave.

BRIEF DESCRIPTION OF THE DRAWINGS

The foregoing and other objects, features and advantages of the present invention should become apparent from the following description when taken in conjunction with the accompanying drawings, in which.

DETAILED DESCRIPTION OF THE PREFERRED EMBODIMENT

The present invention relates to a ground fault circuit interrupter 10 that is electrically connected between an AC power supply (not shown) and a load circuit (not shown) which is interconnected to, and energized by, the AC power supply. For example, the AC power supply can be a generator located at a construction site and the load circuit can consist of various portable electric tools or like devices powered by the power supply. In this case, the ground fault circuit interrupter 10 can be supplied as a black box device with appropriate input and output connections. Of course, this is merely an example and the ground fault circuit interrupter 10 according to the present invention can be utilized to provide ground fault protection between any type of AC power supply and a load circuit including, for instance, residential, industrial and other applications, and can be provided in various forms, for instance, mounted internally or externally relative to a power supply, wall or the like.

Figure 1:
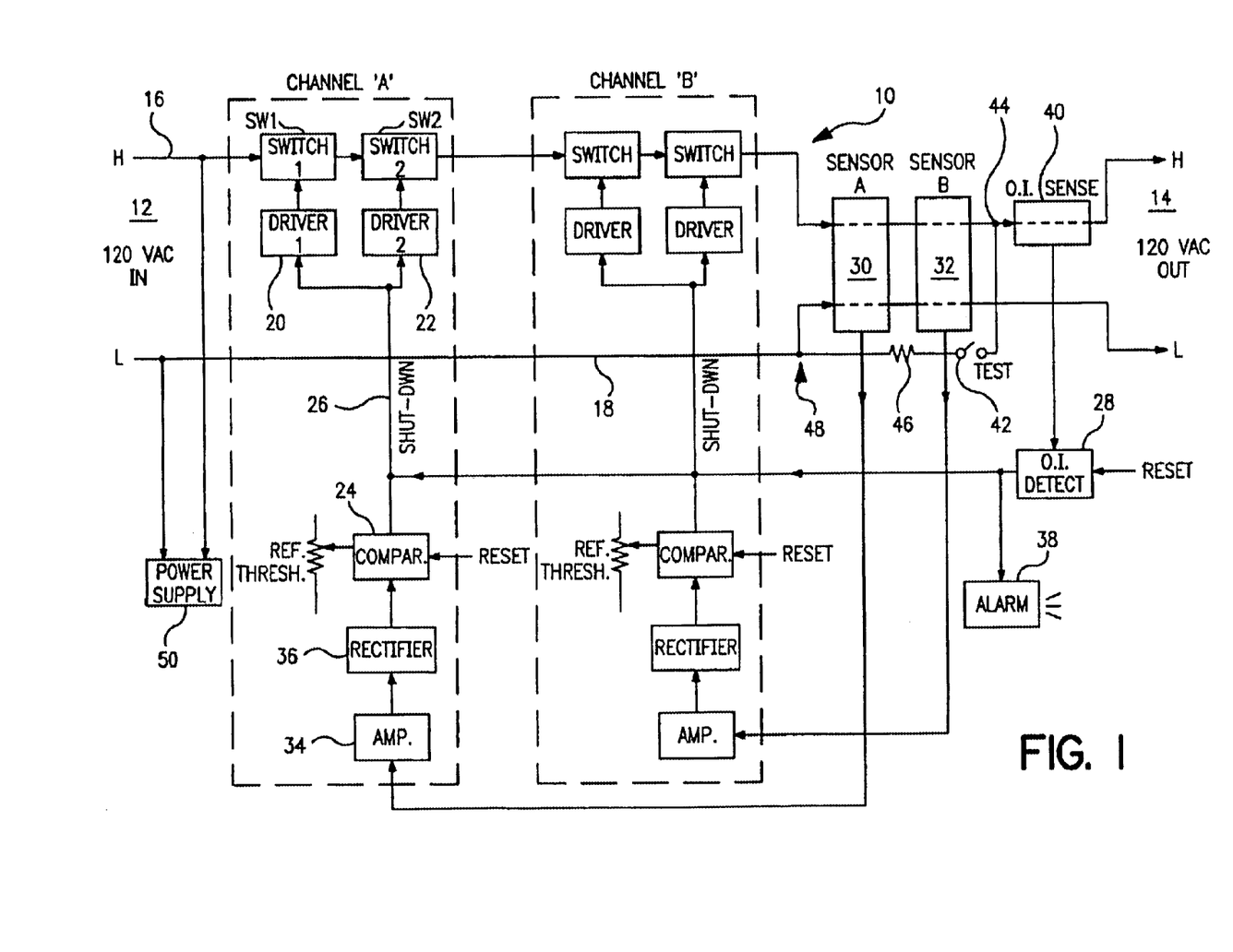
FIG. 1 is a block diagram of an embodiment of a ground fault circuit interrupter according to the present invention.

FIG. 1 provides a block diagram illustrating the general concepts of the ground fault circuit interrupter 10 according to the present invention. The ground fault circuit interrupter 10 is connected to an AC power supply (not shown) by an input, or "in", connection at location 12 and to a load circuit (not shown) by an output, or "out", connection at location 14. Thus, a hot power line 16 extends from the AC power supply through the ground fault interrupter 10 to the load circuit, and a neutral power line 18 extends from the load circuit to the AC power supply. As will be discussed in detail, the ground fault interrupter 10 electrically disconnects this circuit when a ground fault is detected. For purposes of this application, the hot power line 16 is also referred to as the high or lead power line "H", and the neutral power line 18 is also referred to as the low or return power line "L".

As outlined in dashed lines in FIG. 1, the ground fault circuit interrupter 10 includes a channel "A" and a channel "B" which are identical and redundant. Both channels are activated and open the hot power line 16 when a fault occurs, and both are reset together. Thus, if one channel should fail, the other is capable of de-energizing the circuit upon the occurrence of a ground fault. Hereinafter, only channel "A" is described in detail since it is understood that channel "B" is identical to channel "A".

One of the important concepts of the present invention is the use of MOSFETs as switching elements SW1 and SW2 instead of electro-mechanical or other slower reacting electronic devices. The primary advantage of utilizing MOSFETs is that they provide instantaneous on and off switching capability. The switches SW1 and SW2 are both power MOSFET devices that are adequately sized to handle the power and voltage requirements of the ground fault circuit interrupter 10. The MOSFETs can be paralleled devices or single devices depending on availability and desired design. As illustrated in FIG. 1, the switches SW1 and SW2 are electrically connected in series in the hot power line 16 permitting the electrical connection of the AC power source to the load to be broken in the hot power line 16 should a ground fault occur.

MOSFET drivers 20 and 22 interface and apply switching signals to switches SW1 and SW2, respectively, to control the opening (ie., on "shutdown" in the event of a ground fault) and closing (ie., on reset) of the switches SW1 and SW2. The switches SW1 and SW2 remain in an open, or "shutdown" condition, until a reset signal is received by the drivers 20 and 22 via a manually operated reset button (not shown) on the ground fault circuit interrupter 10. Each of the drivers 20 and 22 receive input signals from a fault detect comparator 24 and from an overcurrent detector 28 as will be discussed.

Sensors 30 and 32, also marked "A" and "B" in FIG. 1, are placed on the hot and neutral power lines 16 and 18 for sensing any differential between current flowing in the hot and neutral power lines 16 and 18. These sensors are identical and redundant. The differential in current flowing in the hot power line 16 relative to the neutral power line 18 indicates the presence of a ground fault. As stated previously, typically ground fault current is relatively small but potentially very dangerous. The AC ground fault current differential signal is passed from sensor 30 to channel "A" and also redundantly from sensor 32 to channel "B".

An amplifier 34 located in channel "A" receives the AC current differential signal sent from sensor 30. The amplifier minimizes the frequency bandwidth and amplifies the signal. The amplified AC ground fault current sine wave differential signal is input into a rectifier 36 where the signal is full wave rectified so that both halves of each sine wave are positive. For example, see FIG. 5B. The advantage provided by the use of the rectifier 36 is that it provides the ground fault circuit interrupter 10 with two opportunities to detect the fault within a single sine wave should it occur at a time relative to either half of the single sine wave. Otherwise, the ground fault circuit interrupter would have to wait until the positive half of the next sine wave to detect the fault which wastes a half cycle of time and extends the time an individual may be subjected to fault current.

The rectified signal is input into the comparator 24 which is the component that actually determines whether or not a ground fault exists. A predetermined fault current threshold setting is stored in the comparator 24 and is compared to the rectified fault signal amplitude. For example, see FIG. 5B. Typically, the fault current threshold setting corresponds to about 5 milliamps of actual ground fault current detected; however, other settings can be utilized as desired.

If the comparator 24 determines that an amplitude of the rectified fault signal exceeds the threshold setting, a fault is detected, and the comparator 24 stores the fault signal and transits a shutdown signal via a "shutdown" bus 26 to the drivers 20 and 22 to open switches SW1 and SW2. In addition, the signal output by the comparator 24 is applied to an alarm 38 which activates a visible and/or audible alarm that indicates a ground fault has been detected. Thereafter, the comparator output shutdown signal is reversed only by manual actuation of a reset switch (not shown) which returns the comparator 24 to its initial state before detecting the fault. Thus, until the reset switch is actuated, the switches SW1 and SW2 remain open, the alarm remains activated, and the AC power source remains disconnected from the load circuit.

An overcurrent detector 28 is electrically connected to the hot power line 16 via an overcurrent sensor 40 to measure the level of load current. The overcurrent detector 28 rectifies the AC load current signal to a DC signal and has a comparator which compares the DC signal to a predetermined maximum current threshold setting. This threshold setting is set at a level of current in which the switches SW1 and SW2, and other electronic components, can safely operate without being damaged. When an overcurrent condition is detected, the output from the comparator of the overcurrent detector 28 is applied to the drivers 20 and 22, as well as the drivers in channel "B", to open switches SW1 and SW2 and the corresponding switches in channel "B" in the same manner as if a ground fault was detected. This enables the electronics of the ground fault circuit interrupter 10 to be protected in a superior and more reliable manner than if merely protected by a fuse or circuit breaker. The comparator of the overcurrent detector 28 can be designed to be reset by the same manually actuated switch which resets comparator 24, or alternatively, can be reset by a separate switch (not shown).

A test switch 42 is provided on the ground fault circuit interrupter 10 for use in testing the proper functioning of the ground fault detect and shutdown operations of the interrupter 10. The test switch 42 is normally open, is connected to the hot power line 16 at a location 44 on the load circuit side of the sensors 30 and 32, and is connected via a resistor 46 to the neutral power line 18 at a location 48 on the AC power supply side of the sensors 30 and 32. The resistance of resistor 46 is selected such that, when the test switch 42 is depressed, only a relatively small current consistent with a ground fault flows through the test circuit. Thus, since the test circuit is connected on opposite sides of the sensors 30 and 32, a differential current should be detected by the sensors 30 and 32 as in the case of an actual ground fault when the test switch 42 is closed and shutdown should occur. In this manner the test switch 42 can be utilized to simulate a ground fault condition and test the effectiveness of all the electronic components of the ground fault circuit interrupter 10.

In addition to the above components, the ground fault circuit interrupter 10 also has a power supply 50 for providing the electronics of the interrupter 10 with DC voltages for internal usage.

The block diagram of FIG. 1 provides a preferred embodiment of the present invention; however, other embodiments can be utilized within the scope of the present invention to overcome the disadvantages stated previously relative to prior art GFCIs and to meet the objectives of the present invention. The value of the present invention is its high reliability and substantially instantaneous detecting and clearing of ground faults which protects and can save human life.

By way of example and not by way of limitation, FIGS. 2–7 provide greater detail with respect to specific electronic components and circuits capable of use in the above described ground fault circuit interrupter 10. The description of these components comply with the best mode requirement, and other known components and circuits for performing similar specific tasks (ie., amplifying, rectifying, comparing, etc.) can also be utilized.

Figure 2:
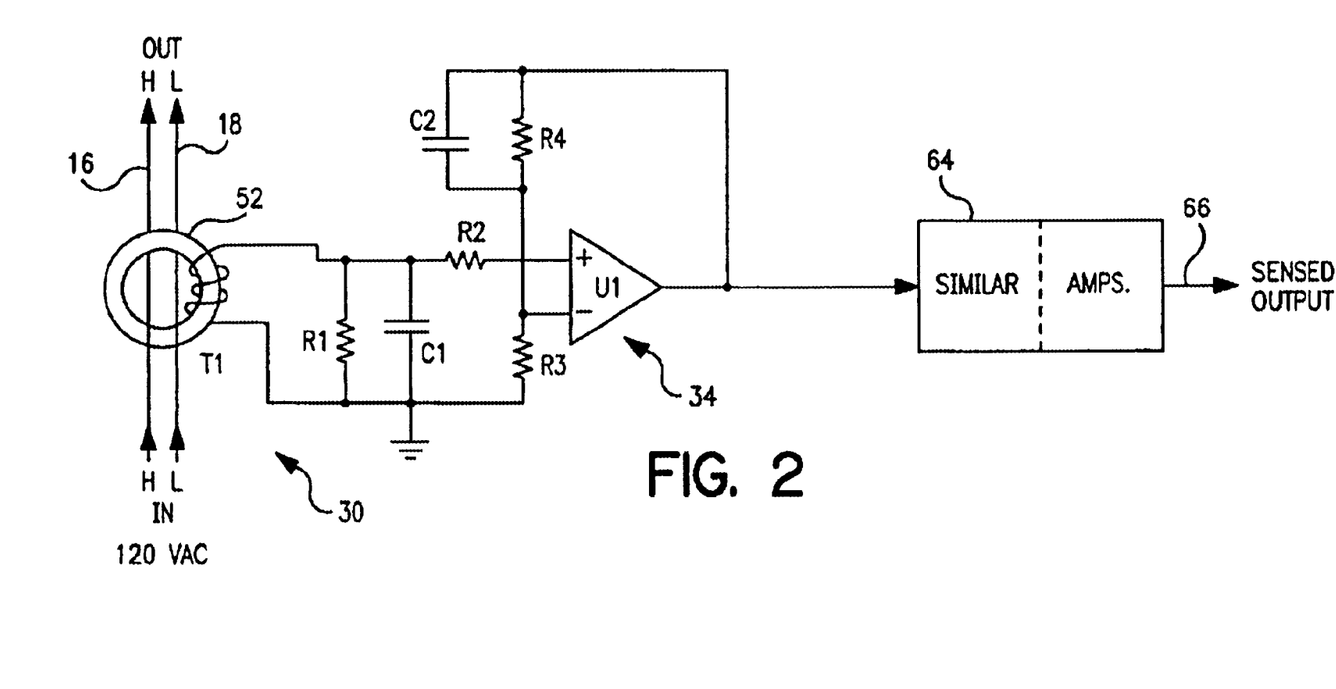
FIG. 2 is an electrical circuit diagram of sensor and amplifier circuitry for use in the ground fault circuit interrupter shown in FIG. 1.

FIG. 2 illustrates an example of a specific embodiment of a sensor 30 and amplifier 34 combination identified in FIG. 1 for detecting and amplifying a ground fault. The sensor 30 has a sensor coil 52 through which the hot and neutral power lines 16 and 18 extend and about which a sensor output winding T1 is wound. The sensor output winding T1 is connected to a terminating resistor R1 and a capacitor C1 for filtering noise. When a load is placed across the hot and neutral power lines, 16 and 18, an equal amount of current flows through each line but in opposite directions, and thus, no output signal is generated within the sensor output winding T1. However, if a ground fault exists and an equal amount of current does not flow through each line, the differential generates a signal in the sensor output winding T1. This signal is transmitted to an amplifier U1 which magnifies the signal to a suitable output level. Capacitor C2 and resistor R4 provide part of a bandpass network that limits the frequency bandwidth of the amplifier U1 for noise reduction purposes, and resistors R2 and R3 minimize the differential input currents of the op-amp U1. As illustrated in FIG. 2 by block 64, additional stages of amplifiers similar to amplifier 34 can be utilized to magnify the signal to a suitable level at output 66.

Figure 3:
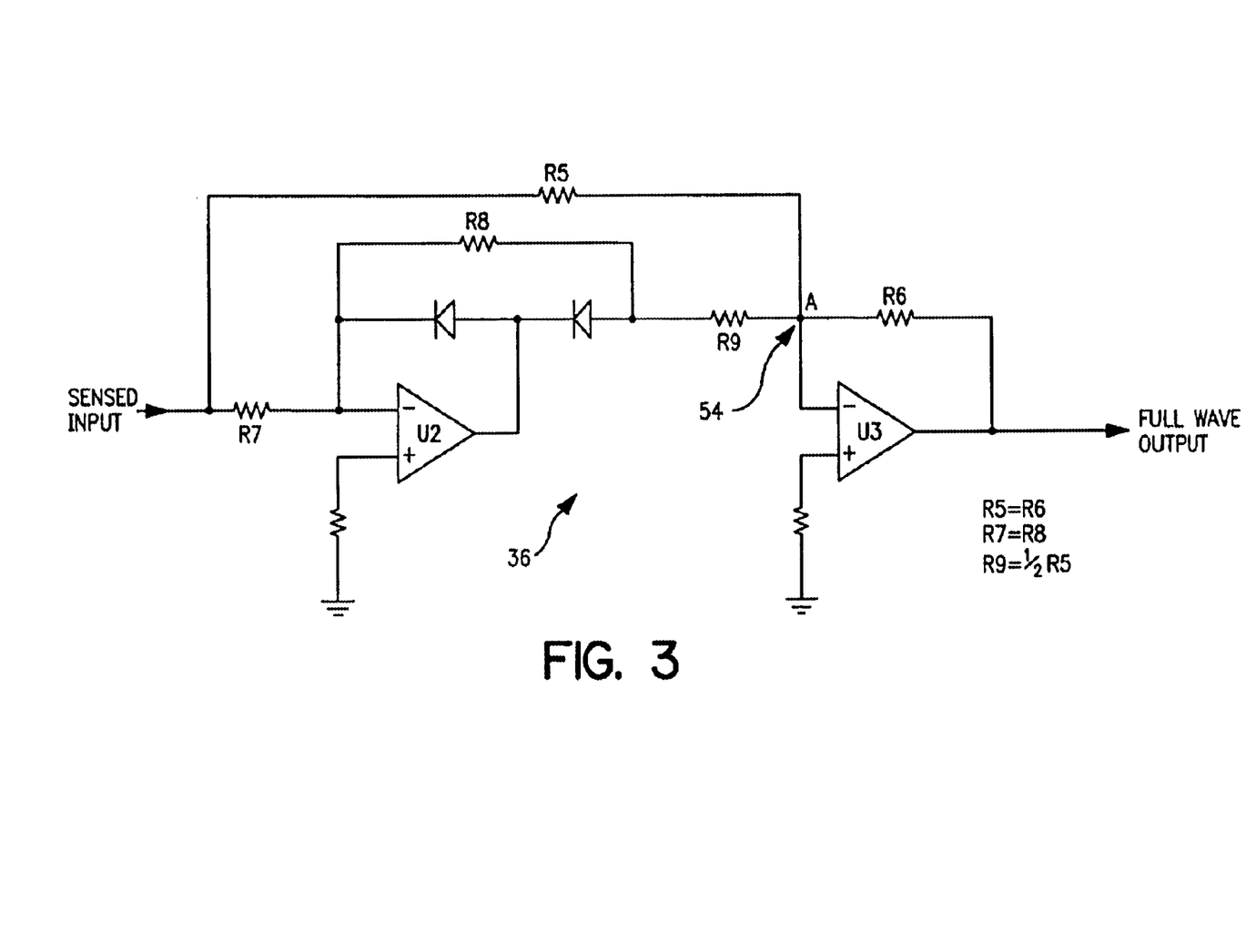
FIG. 3 is an electrical circuit diagram of full wave rectifier circuitry for use in the ground fault circuit interrupter shown in FIG. 1.

A precision full wave rectifier 36 is illustrated in FIG. 3 and includes unity gain amplifiers U2 and U3. The amplified signal from amplifiers 64 is output at 66 and applied to the rectifier 36 which rectifies the signal such that both halves of each sine wave is made positive to allow the comparator 24 to compare a pair of amplitudes per full sine wave. Unity gain amplifier U2 is held at +0.7 v for the negative portion of the sine wave while unity gain amplifier U3 passes the signal which is thus inverted and positive. Resistors R5 and R6 set amplifier U3 to unity gain. During the positive portion of the input sine wave, U2 operates normally and is connected to a summing point at location 54 by resistor R9. Resistors R7 and R8 set amplifier U2 to unity gain. Since resistor R9 is smaller than R5, the negative going signal from amplifier U2 dominates the positive going signal from R5 relative to the input currents into the negative port of amplifier U3. This signal is inverted by U3 to provide a positive going signal to output. Thus, a continuous series of positive half sine waves are produced in the output of the rectifier 36.

Figure 4:
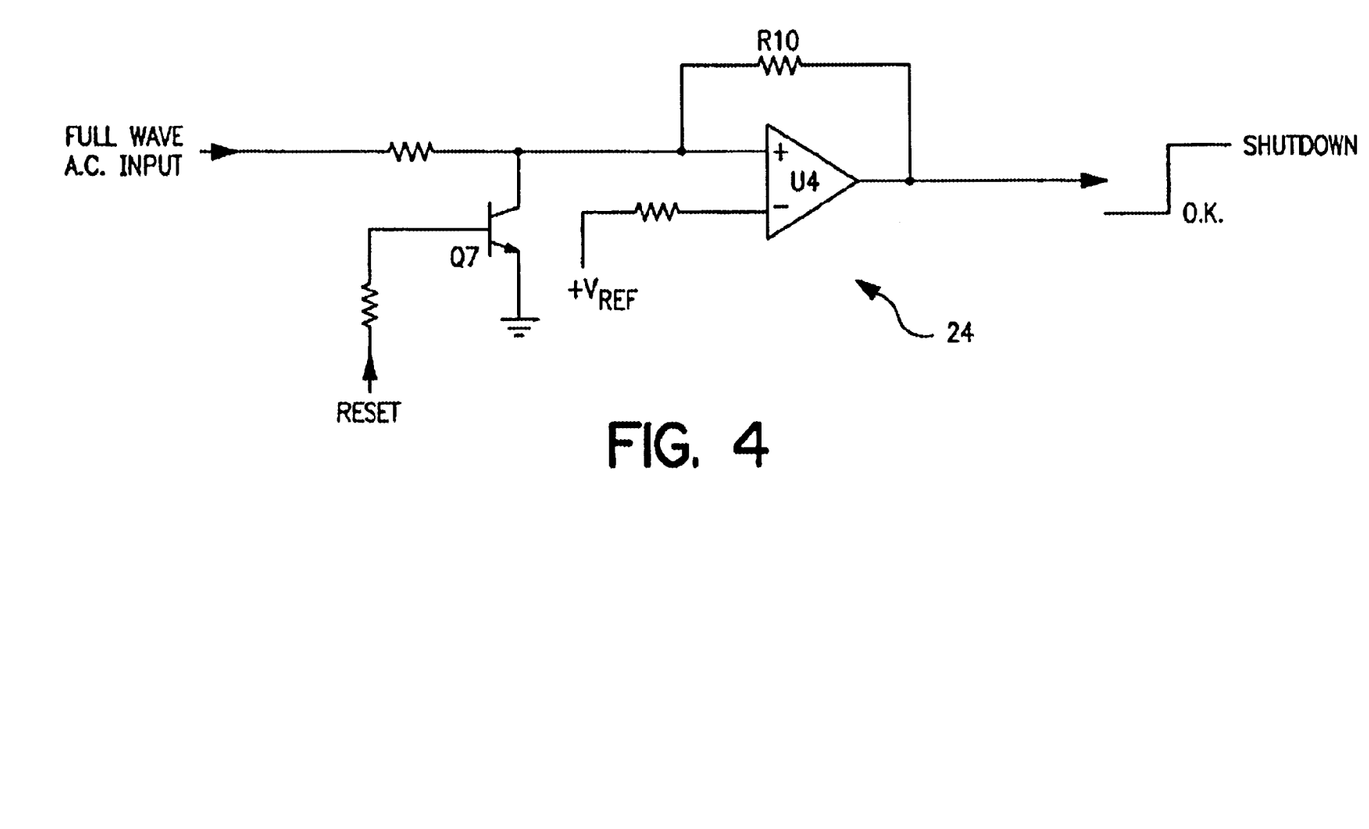
FIG. 4 is an electrical circuit diagram of comparator circuitry for use in the ground fault circuit interrupter shown in FIG. 1.

The comparator 24 is shown in detail in FIG. 4 and is where the rectified ground fault signals are compared to a DC reference. The DC reference is calculated to be equal to the amplitude of a ground fault signal when it results from a preset fault current value such as 5 mA. This reference signal is applied to the negative port of amplifier U4 while the rectified fault signal is applied to the positive port of the amplifier U4. When the fault signal is greater than the reference signal, the comparator 24 activates and the amplifier U4 is held at a high output (corresponding to "shutdown") by R10. The high output opens the switches of the ground fault circuit interrupter 10 thereby interrupting the fault and protecting individuals from injury. Amplifier U4 is reset when Q7 is turned on and shorts the positive port of the amplifier U4 to ground. When the output of amplifier U4 goes low, the switches SW1 and SW2 of the ground fault circuit interrupter 10 close, (ie., permit current to flow from the power source to the load circuit) to place the interrupter 10 back in a normal operating condition.

An important feature of the interrupter 10 according to the present invention is that the timing between fault detection and fault removal is substantially instantaneous and that the timing between fault initiation and fault removal occurs within about 8 milliseconds and within the length of about half a sine wave. This timing is extremely important since a person may be subjected to fault current for the time period which the fault exists before it is cleared.

Figure 5A:
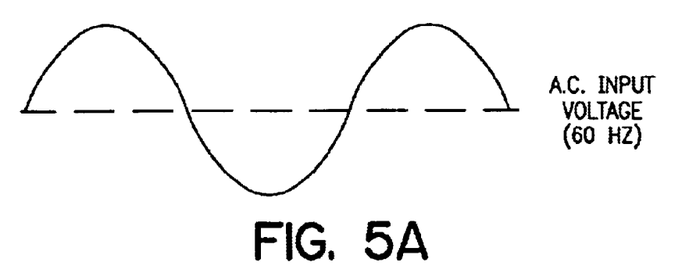
FIG. 5A is an illustration of an AC ground fault current sine wave versus input AC voltage at 60 Hz.
Figure 5B:
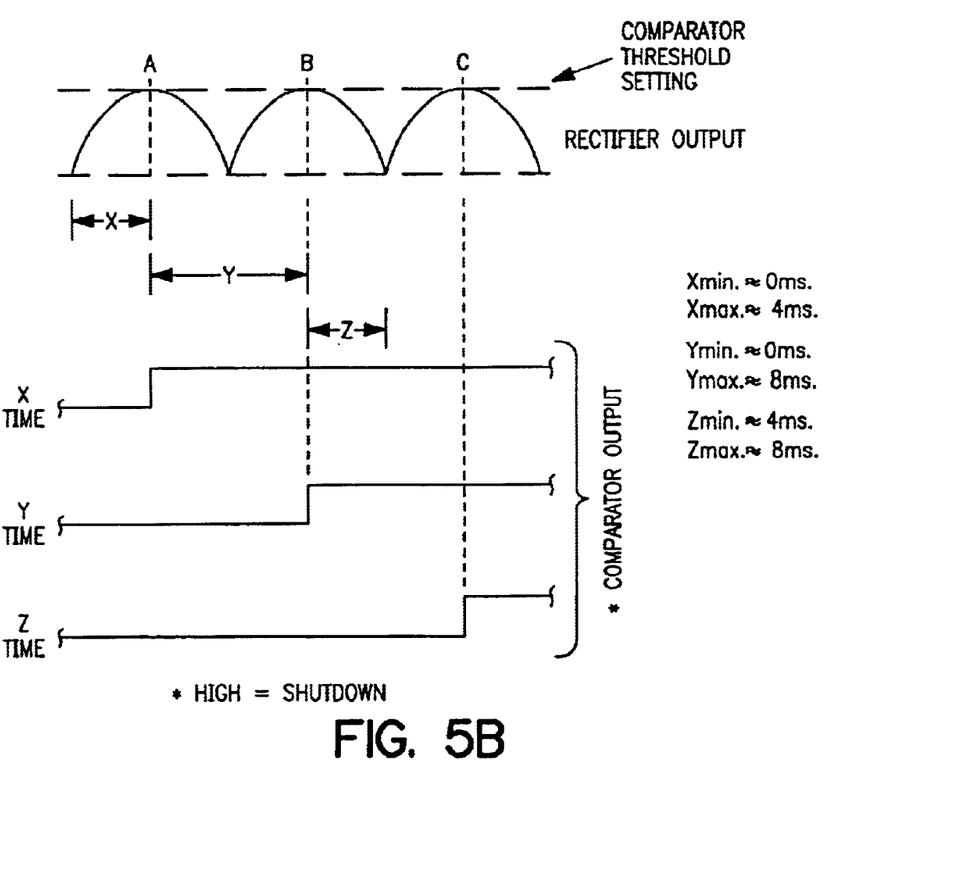
FIG. 5B is an illustration of the AC ground fault current wave output from the rectifier circuitry and an illustration of the corresponding comparator output showing the timing between fault occurrence and shutdown for various intervals of time within a single sine wave.

As an example of the timing of interrupter 10, FIG. 5A illustrates an AC ground fault signal as amplified by amplifier 34, and FIG. 5B illustrates a rectified ground fault signal relative to a threshold setting. The timing from fault initiation to fault removal, or "shutdown", is variable depending on where the fault is initiated within the AC sine wave. As shown in FIG. 5B, time periods x, y and z represent one full sine wave, and shutdown occurs at points A, B and C which correspond to the amplitudes of the rectified fault signal. Thus, if the fault occurs within time range "x", shutdown occurs at point A; if the fault occurs within time range "y", shutdown occurs at point B; and if the fault occurs within time range "z", shutdown occurs at point C. Thus, for faults occurring during time "x", shutdown occurs within 4 milliseconds of fault initiation, and for faults occurring during times "y" and "z", shutdown occurs within 8 milliseconds of fault initiation. For faults occurring during time "z", the next quarter half sine wave is needed for shutdown. These shutdown times apply with respect to MOSFET switching devices and not other electronic switching devices, such as a thyristors, which do not switch instantaneously and which require additional switching time after fault detection until the sine wave goes to zero volts.

Figure 6:
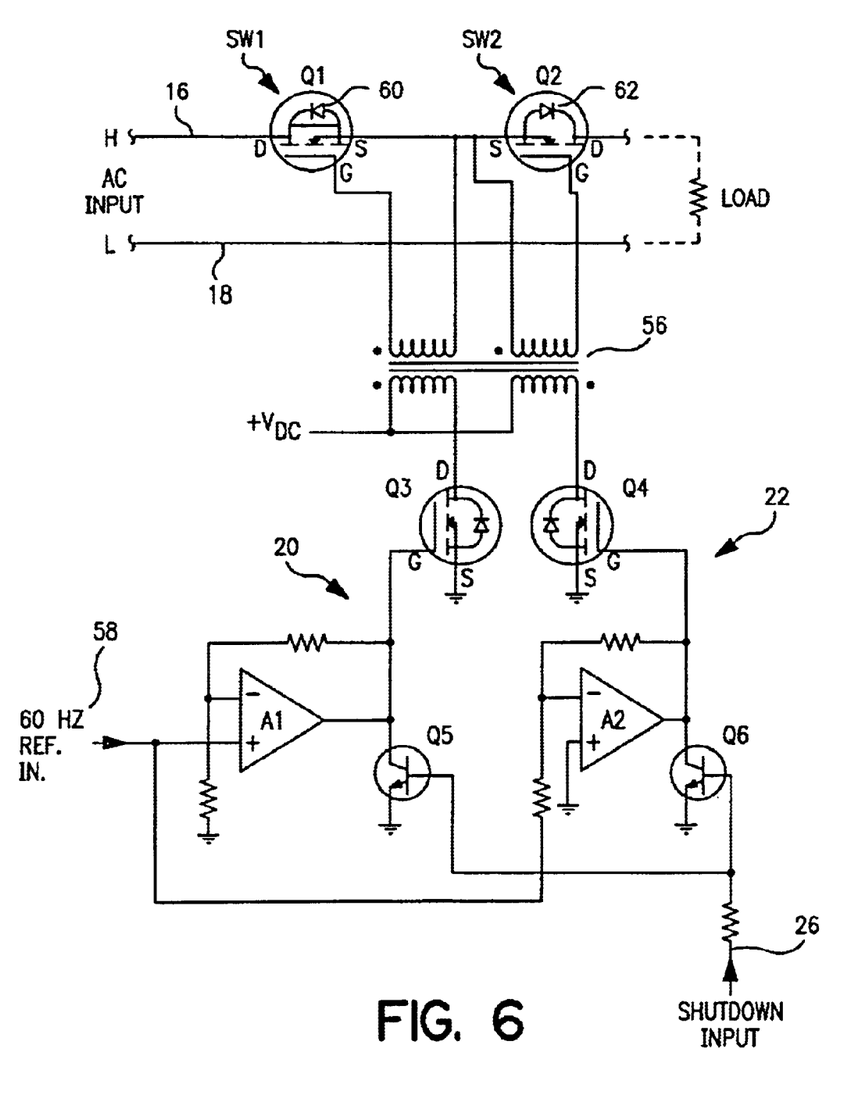
FIG. 6 is an electrical circuit diagram of switching and driver circuitry for use in the ground fault circuit interrupter shown in FIG. 1.

The switching and driving circuitry of one channel of the ground fault circuit interrupter 10 is illustrated in FIG. 6. The other channel is identical and provides a redundant function. The switches SW1 and SW2 are MOSFET transistors, Q1 and Q2, which preferably each have an internal substrate diode, 60 and 62, respectively, connected from drain (D) to source (S). The drain (D) and source (S) of the MOSFET transistor Q1 is placed in series in the hot power line 16. The drain (D) and source (S) of the MOSFET transistor Q2 is also placed in series in the hot power line 16 adjacent to Q1. As illustrated in FIG. 6, the sources (S) of Q1 and Q2 are disposed back to back and face each other.

A transformer 56 couples and isolates the gate signals of the MOSFETs Q1 and Q2 which are driven push-pull by smaller MOSFET driver transistors, Q3 and Q4. The transformer 56 applies positive gating of the power MOSFETs, Q1 and Q2, for "turn on" conditions and negative gating for "turn off" conditions. The driver MOSFETs Q3 and Q4 are supplied with input from op-amps A1 and A2, respectively, which in turn are driven by a reference sine wave 58 provided by a power supply transformer (not shown). This 60 Hz reference overdrives the op-amps A1 and A2 and causes them to produce square waves synchronous with the AC input sine wave 58. Both drivers Q3 and Q4 require a positive signal to go on for each half cycle of the input AC sine wave 58. Thus, op-amp A1 is a non-inverter to take care of the positive half of the reference sine wave 58, and A2 is an inverter to take care of the negative half of the reference sine wave 58.

"Shutdown" of the switches Q1 and Q2 occurs when a shutdown signal from the comparator 24 turns on transistors Q5 and Q6 which conduct and which short the gates of drivers Q3 and Q4 to ground. In this situation, neither power MOSFET, Q1 or Q2, can be on, and thus, shutdown (ie., switch opening) is achieved.

An important concept of the present invention is the use of the internal substrate diodes, 60 and 62, which connect across the drain (D) and source (S) of each power MOSFET, Q1 and Q2. The diodes 60 and 62 are disposed back to back so that during shutdown they prevent any current from passing through the hot power line 16 to the load circuit. However, during normal non-fault operations, the diodes, 60 and 62, switch on and off during each half cycle of the AC current sine wave so that one, and only one, of the diodes, 60 and 62, is conducting at all times as discussed in detail below. While the preferred embodiment utilizes internal substrate diodes, alternate embodiments can utilize separate externally applied diodes.

During normal non-fault operating conditions, Q1 is on when the AC current sine wave on the hot power line 16 input into Q1 is positive. Thus, current is permitted to flow from the drain (D) to the source (S) in Q1. However, the diode 60 connecting across the drain (D) and source (S) of Q1 is back biased and thus, is off and does not permit current to flow therethrough. At the same time, Q2 is off and no current can flow through Q2 between its drain (D) to source (S). However, current can flow through diode 62 from the source (S) of Q2 to the drain (D) of Q2. Therefore, for the above described phase, Q1 and diode 62 of Q2 are normally conducting while Q2 and diode 60 of Q1 are off. The reverse is true for the negative half cycle when Q2 is on and normally conducting from its drain (D) to source (S) and its substrate diode 62 is off and when Q1 is off and its substrate diode 60 is conducting. Thus, at any given time during normal non-fault operation, current is permitted to flow from the drain to the source within one of the power MOSFETs, Q1 or Q2, while current is permitted to flow through the opposite one's corresponding substrate diode, 60 or 62.

When a fault is detected, each power MOSFET Q1 and Q2 is turned off and does not conduct current between its respective drain (D) and source (S). Thus, the turning off of Q1 and Q2 in combination with the back-to-back disposition of the substrate diodes 60 and 62, prevents any current form passing through the ground fault circuit interrupter 10. This defines a "shutdown" condition.

Figure 7:
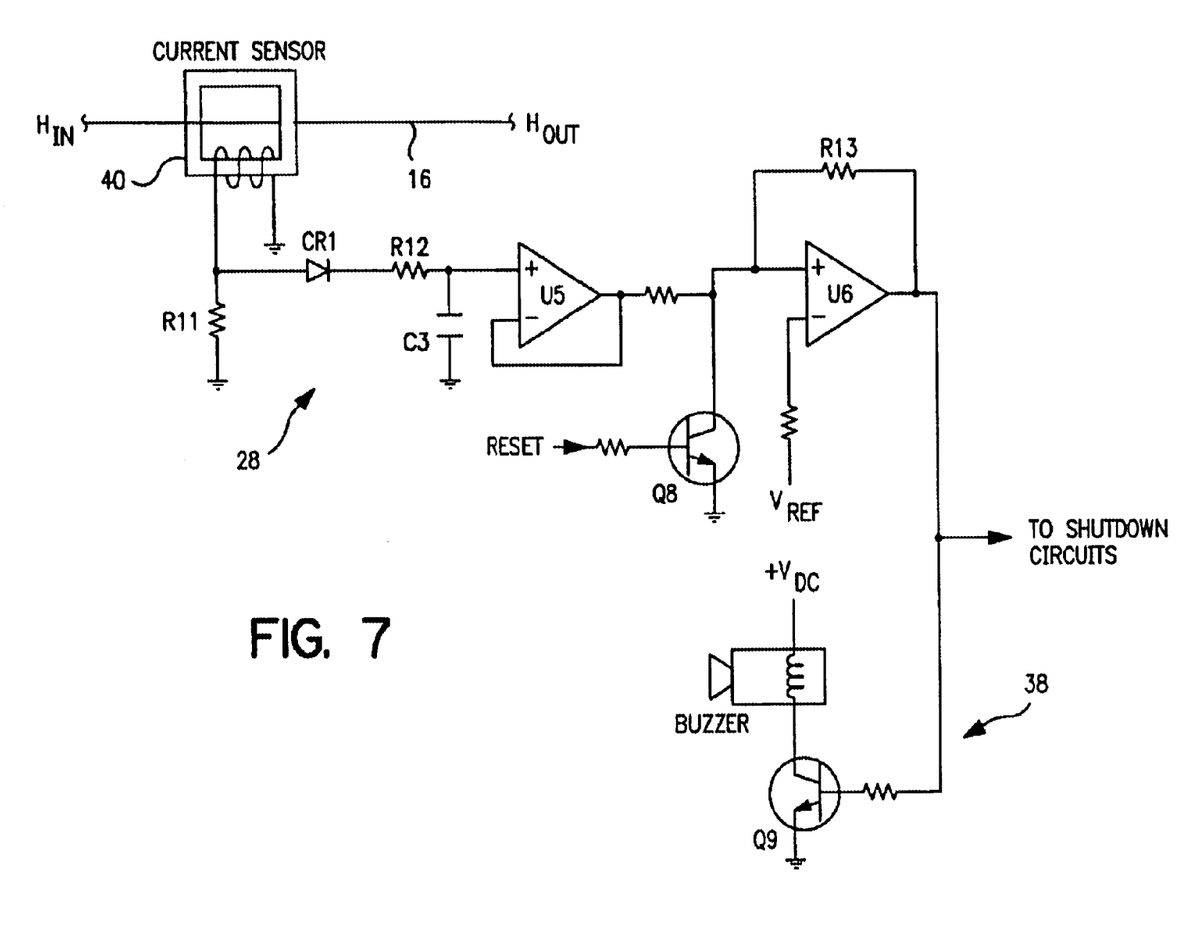
FIG. 7 is an electrical circuit diagram of overcurrent and alarm circuitry for use in the ground fault circuit interrupter shown in FIG. 1.

Turning to FIG. 7, an embodiment of an overcurrent detector 28 and an alarm 38 is disclosed. A sensor coil 40 is placed about the hot power line 16 to extract a sine wave replica of the current passing through the switches SW1 and SW2 of the ground fault circuit interrupter 10 and into the load circuit. The amplitude of this sine wave signal represents the amount of load current to which SW1 and SW2 are exposed. The signal passes through the load resistor R11 of the coil 40, is rectified by diode CR1, and is filtered by resistor R12 and capacitor C3 to produce a DC signal relative to the load amplitude of the sine wave signal. The DC signal passes through unity gain amplifier U5 to comparator U6. A threshold reference value is input into the negative port of U6 and corresponds to a DC signal maximum value obtained when the load current reaches a level considered maximum for the protection of the ground fault circuit interrupter 10. When the DC signal applied to the positive port of comparator U6 reaches the threshold value, the comparator U6 activates and its output goes from low to high and thereafter remains high by virtue of the feedback resistor R13. The output of comparator U6 is connected to the "shutdown" bus 26 and shutdown occurs the same as if a ground fault were detected. In addition, an alarm is activated by Q9 when the output of the comparator U6 goes high. Comparator U6 is reset by the same circuit utilized to reset the ground fault circuit interrupter 10 after a ground fault by means of a positive signal applied to Q8 which causes the output of U6 to return to low.

The above described ground fault circuit interrupter 10 provides substantially simultaneous detection and removal of ground faults to maximize electric shock protection for individuals that unintentionally become a part of a ground fault loop circuit. This prevents serious injuries and saves lives. In addition, the interrupter 10 provides redundant channels all the way back to the sensors so that a failure of any one part will not prevent the ground fault circuit interrupter 10 from functioning properly to detect a ground fault and instantaneously switch open. Even if the internal power supply fails, the switches will open.

The above described ground fault circuit interrupter 10 provides one preferred embodiment of the present invention and various modifications can be made thereto. Various of the electronic components can be replaced with other known components for accomplishing a specific task. However, the unique concept of the present invention is a ground fault circuit interrupter which utilizes electronic switching elements that provide substantially instantaneous switching and that provides an interrupter with great reliability.

While a preferred ground fault circuit interrupter has been described in detail, various modifications, alterations, and changes may be made without departing from the spirit and scope of the device and method according to the present invention as defined in the appended claims.

What is claimed is:

1. A ground fault circuit interrupter for use on a circuit including an AC power source and a load electrically connected via hot and neutral lines, comprising a current sensor for sensing current on both the hot and neutral lines and for generating a differential current signal based on any differential between the current flowing in the hot line relative to the current flowing in the neutral line, and a switching component forming part of the circuit for opening the circuit when said differential current signal exceeds a threshold value, said switching component being a pair of MOSFET switching components which permit substantially instantaneous switching and which comprise a single channel of said interrupter, a first of said pair of said MOSFET switching components being connected in series across its drain and source to the hot line of the circuit, and a second of said pair of said MOSFET switching components being connected across its drain and source adjacent and in series with said first MOSFET switching component in the hot line of the circuit.

2. A ground fault circuit interrupter according to claim 1, wherein said interrupter includes a pair of identical and redundant channels.

3. A ground fault circuit interrupter according to claim 1, wherein said sources of said pair of MOSFET switching components are disposed such that they face each other.

4. A ground fault circuit interrupter according to claim 3, wherein each of said MOSFET switching components has a diode connected across its drain and source, whereby, during a normal non-fault condition, current flows in a path from drain to source through one of said pair of MOSFET switching components while current flows in a path from source to drain of said opposite MOSFET switching component through its diode, and during a ground fault condition in which a differential is detected between the current flowing in the hot line relative to the current flowing in the neutral line, both MOSFET switching components prevent any flow of current through the drain to source paths.

5. A ground fault circuit interrupter according to claim 4, wherein said diodes are disposed back to back so that current flowing in a given direction on the hot line is blocked from passing through one of said diodes and is permitted to flow through the other of said diodes.

6. A ground fault circuit interrupter according to claim 1, wherein said MOSFET switching components of said interrupter opens the circuit to clear a ground fault that causes a differential between the current flowing in the hot line relative to the current flowing in the neutral line within 16 milliseconds after initial occurrence of the ground fault and within one single AC fault current sine wave length of a 60 Hz sine wave.

7. A ground fault circuit interrupter according to claim 6, wherein said MOSFET switching components of said interrupter opens the circuit to clear a ground fault that causes a differential between the current flowing in the hot line relative to the current flowing in the neutral line within 8 milliseconds after initial occurrence of the ground fault and within a half of one single AC fault current sine wave length of a 60 Hz sine wave.

8. A ground fault circuit interrupter according to claim 2, wherein each channel includes an amplifier for amplifying said differential current signal, a rectifier for full wave rectifying said differential current signal after it has been amplified, and a comparator for comparing said amplified and rectified differential current signal to the preset threshold level to determine whether a ground fault that causes a differential between the current flowing in the hot line relative to the current flowing in the neutral line exists on the circuit.

9. A ground fault circuit interrupter according to claim 8, further comprising a pair of redundant current sensors each for independently generating an AC ground fault differential current signal, wherein one sensor transmits its generated signal to one of said channels of said interrupter and the other sensor transmits its generated signal to the other of said channels of said interrupter.

10. A ground fault circuit interrupter according to claim 8, wherein each channel includes a separate driver for each of said MOSFET switching components, and wherein said drivers interconnect to the gates of said MOSFET switching elements components and to said comparator, whereby, when a shutdown signal is received from said comparator indicating the presence of a ground fault that causes a differential between the current flowing in the hot line relative to the current flowing in the neutral line, said drivers place the MOSFET switching components in an off condition in which no current in any of said MOSFET switching components is permitted to flow from drain to source.

11. A ground fault circuit interrupter according to claim 10, further comprising an overcurrent detector for sensing load current on the hot line, for comparing the current relative to an overcurrent threshold value of said interrupter, and for transmitting a shutdown signal to said drivers.

12. A ground fault circuit interrupter according to claim 9, further comprising a test circuit for simulating a ground fault relative to said sensors to test the operation of said interrupter.

13. A ground fault circuit interrupter for protecting a circuit including an AC power source and a load electrically connected via hot and neutral lines, wherein the improvement comprising:

a channel having a pair of MOSFET switching components forming part of the circuit for opening the circuit upon occurrence of a differential in current flowing in the hot line relative to the neutral line, each of said pair of MOSFET switching components being connected in series across its drain and source to the hot line of the circuit, and said sources of said pair of MOSFET switching components being adjacent and disposed back to back; and a current sensor for sensing current on both the hot and neutral lines and for generating and passing to said channel a differential current signal based on a current differential between the current flowing in the hot line relative to the current flowing in the neutral line;

each of said MOSFET switching components having a diode connected across its drain and source, and said diodes being disposed in a back-to-back relation;

during a normal non-fault condition, current flows in a path from drain to source through one of said pair of MOSFET switching components while current flows in a path from source to drain of said opposite MOSFET switching component through its diode, and during a fault condition that causes a differential between the current flowing in the hot line relative to the current flowing in the neutral line, both MOSFET switching components are placed in an off condition and prevent any flow of current through the drain to source paths.

14. A ground fault circuit interrupter according to claim 13, wherein said interrupter includes a pair of identical and redundant channels.

15. A method of providing ground fault protection to a circuit including an AC power source and a load electrically connected via hot and neutral lines, comprising the steps of:

electrically connecting each of a pair of MOSFETs in series across its drain and source to the hot line of the circuit, said sources of said pair of MOSFETs being disposed back to back, each of said MOSFETs having a diode connected across its drain and source, and said diodes being disposed in a back-to-back relation;

during a normal operating condition, permitting current to flow in a path from drain to source through one of said pair of MOSFETs while permitting current to flow in a path from source to drain of said opposite MOSFET via its diode; and when a differential between the current flowing in the hot line relative to the current flowing in the neutral line is detected, substantially instantaneously driving both MOSFETs into an off condition to prevent any flow of current within the MOSFETs through the drain to source paths.

16. A method according to claim 15, wherein said MOSFETs clear a ground fault that causes a differential between the current flowing in the hot line relative to the current flowing in the neutral line within 16 milliseconds after initial occurrence of the ground fault and within one single AC fault current sine wave length of a 60 Hz sine wave.

17. A method according to claim 16, further comprising the steps of:

sensing for a differential in current flowing through the hot and neutral lines;

generating an AC ground fault current signal corresponding to said differential sensed during said sensing step;

amplifying said AC ground fault current signal;

full wave rectifying said AC ground fault current signal;

comparing said AC ground fault current signal, after said amplifying and rectifying steps, to a preset stored ground fault threshold level to determine whether a ground fault exists on the circuit; and sending a shutdown signal to drivers of said pair of MOSFETs when a ground fault is detected, to place the MOSFETs in a non-conducting off condition.

* * * * *